United States Patent [19]

Homan

[11] Patent Number: 4,932,475
[45] Date of Patent: Jun. 12, 1990

[54] BLADE PLOW WITH RESILIENT MOUNTING

[76] Inventor: Barry F. Homan, Vanity & Thackeray Streets, Toowoomba, Queensland 4350, Australia

[21] Appl. No.: 226,695

[22] Filed: Aug. 1, 1988

[30] Foreign Application Priority Data

Jul. 30, 1987 [AU] Australia .................................. PI3428
Jul. 30, 1987 [AU] Australia .................................. PI3427
Sep. 23, 1987 [AU] Australia .................................. PI4521

[51] Int. Cl.$^5$ .................... A01B 63/14; A01B 63/114
[52] U.S. Cl. .................... 172/239; 172/322; 172/720; 172/253; 172/747; 172/498; 172/678
[58] Field of Search .............. 172/605, 239, 238, 720, 172/328, 396, 324, 326, 327, 498, 678, 322, 677, 720, 730, 747

[56] References Cited

U.S. PATENT DOCUMENTS

| | | | |
|---|---|---|---|
| 1,801,979 | 4/1931 | Robinson | 172/326 X |
| 1,854,902 | 4/1932 | Johansen | 172/322 X |
| 1,854,903 | 4/1932 | Robinson | 172/322 X |
| 1,934,645 | 11/1933 | Rhodes | 172/498 X |
| 2,323,412 | 7/1943 | Noble | 172/720 |
| 3,684,032 | 8/1972 | Hawkins | 172/720 |
| 3,882,749 | 5/1975 | Tourek | 172/747 |
| 4,106,568 | 8/1978 | Cline | 172/396 |
| 4,108,248 | 8/1978 | Anderson | 172/328 |
| 4,217,962 | 8/1980 | Schaefer | 172/326 |

FOREIGN PATENT DOCUMENTS

656568 4/1979 U.S.S.R. .............................. 172/730

*Primary Examiner*—Richard J. Johnson
*Attorney, Agent, or Firm*—Pennie & Edmonds

[57] ABSTRACT

This invention relates to a blade plough suitable for use on undulating ground. The blade plough has a floating blade which is able to pivot irrespective of the drawbar attachment to the tractor. A spring mechanism is provided to bias the blade in an operative attitude and thereby compensate for varying soil conditions. The blade also comprises an improved cutting edge having a hard laminate on its underside. Blade extension members are provided for varying the operating width of the blade.

8 Claims, 6 Drawing Sheets

BLADE PLOW WITH RESILIENT MOUNTING

This invention relates to an improved blade plough. In particular, the invention is directed to a blade plough suitable for use on undulating ground, with an improved cutting edge and variable operating width.

A "blade plough" is an earth-working agricultural implement having a horizontal blade which cuts or slices through the earth at a predetermined depth below the surface with minimal disturbance to the surface itself. The blade plough is used to control the growth of unwanted woody vegetation in grazing areas by cutting through the woody root regrowth to thereby kill the unwanted vegetation, yet leaving the fodder grasses on the surface of the ground relatively undamaged. Correct ploughing depth of the blade is therefore critical to the proper operation of the plough. In Australia, the blade plough is particularly suitable for controlling the growth of the brigalow plant (acacia harpophylla).

A conventional blade plough comprises a wheeled frame to which one or more tynes or legs are fastened. The blade is then fastened to the bottom end of each tyne or leg. The frame includes a draw bar which extends forwardly of the plough for connection to a pulling vehicle, such as a tractor or crawler. The frame wheels are generally located intermediate of the blade and the draw bar connection to the tractor.

Much of the land on which the blade plough operates is undulating, e.g. the so-called "Gulgai" or "Melon-hole" country. As the tractor vehicle travels over the undulating terrain, the variations in the height of the draw bar connection will cause the plough frame to pivot about the wheel axle(s), resulting in variation in the ploughing depth of the plough blade. In order to maintain a fairly constant ploughing depth, it has been known to leave the blade pitch control in a free floating condition. In this known system, the plough blade is connected to the wheeled frame which, in turn is pivotally connected to a sub-frame containing the draw bar, as illustrated schematically in FIG 1. This system allows the blade plough to continue ploughing on an uphill plane even after the tractor vehicle has gone over the crest of the hill or undulation and is travelling downhill. In other words, the plough blade is not directly responsive to variations in the height of the draw bar connection to the tractor. This independence is due principally to the spaced relationship of the points D, E and H shown in FIG. 1. Namely, the wheel axle point E is located forwardly of the pivotal connection point D between the draw bar sub-frame and the plough frame, and this allows the pitch adjustment point I, if it is not fixed, to float upwards relative to the draw bar sub-frame when the wheel negotiates an undulation G'. By allowing the front of the plough frame to float upwards relative to the draw bar, the blade 20 is not forced out of the ground as the draw bar attachment H passes over an undulation.

In order to work effectively, the free floating pitch system requires a dominant or stabilizing downward force acting at the pitch control point I. In the known "free floating" pitch control system, the forward pulling action at D being resisted by the ploughing force on the blade 20 generally provides the required force on the pitch control point I. However, the position of the wheels is critical in countering this force. If the reaction of the wheels is insufficient, the float will not occur. On the other hand, if the upward reactionary force supplied by the wheels is too great, the pitch control point I goes to the top of its range and will remain there. To achieve a true floating effect, the downward force on the pitch control point I must slightly exceed the upward forces provided by the wheels.

A problem encountered by the known free floating pitch control system is that the resistance of the soil varies quite considerably, e.g. with moisture content. Even within the one paddock, there may be substantial variation in soil resistance. This in turn, will cause a large variation in the downward force applied to the pitch control point I and such variations may not be adequately compensated for by the wheel reaction.

Figure 4:
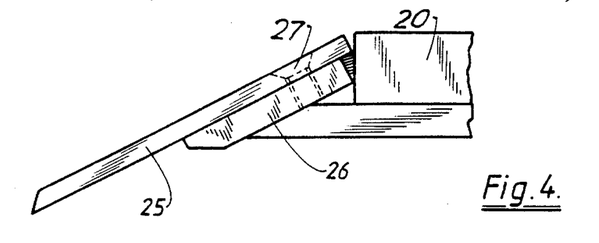
FIG. 4 is a cross sectional view of a conventional cutting edge applied to the mould board of a blade plough.

Known blade ploughs are provided with a cutting edge fastened to the leading edge of the mould board of the plough in some suitable manner, typically by bolting. The cutting edge has a "wood chisel" profile as shown in FIG. 4. That is, it has a sharpened edge pointing forwardly and downwardly to aid in penetrating the soil in much the same manner as the profile of a wood chisel assists in penetrating a piece of wood being worked.

Figures 5, 6:
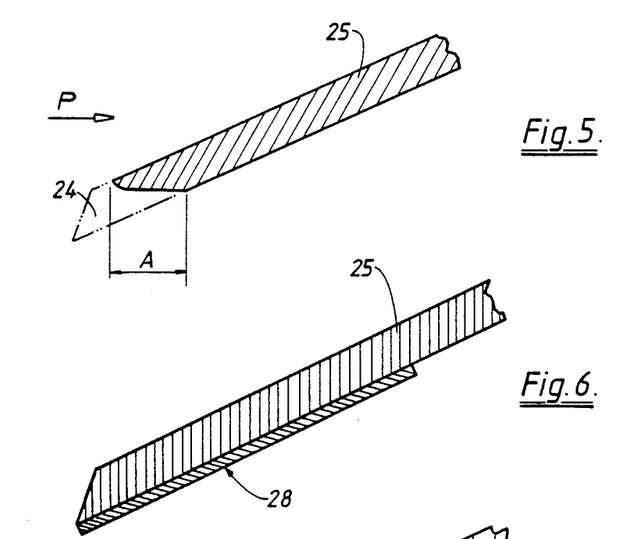
FIG. 5 is a cross sectional view of the worn profile of the conventional cutting edge of FIG. 4.
FIG. 6 is a cross sectional view of the improved cutting edge of the preferred embodiment.

It has been found that after a period of use, the cutting edge of the blade plough is worn away by soil and rock such that an inverted chisel profile is formed, as shown in FIG. 5. The "land area", marked with the letter A in FIG. 5, now resists the penetration of the soil by the cutting edge. Even though considerable forward force and downward pressure may be applied to the plough, it will not plough the soil efficiently as the land area A will tend to skip over the surface of the soil rather than penetrate the soil.

Several modifications to the cutting edge have been proposed in order to overcome this problem but such modifications have met with little, if any, success. For example, in one known modification the thickness of the cutting edge was increased. However, such increased thickness only served to increase the soil resistance of the cutting edge with the inevitable result that the traction vehicle consumed more fuel or a traction vehicle of higher horsepower rating was required. Furthermore, even a thickened cutting edge would wear, giving rise to an even greater land area which resisted soil penetration. Another disadvantage of the thickened cutting edge was the increased cost of material required.

Another modification involved the hardening of the front and top leading faces of the cutting edge or the coating of the front and top leading faces with a layer of harder wear-resistant material. However, the harder layer was worn away gradually from the bottom up, and a land area was still formed to resist soil penetration.

Yet another modification involved the application of extra weight to the plough frame to increase downward force. However, this met with limited success as fuel efficiency was substantially reduced.

To withstand the high bending and torsional forces encountered during use, the plough blade is usually made from thick steel plate. In designing blade ploughs, the operating width is limited by several factors, including the power of the tractive vehicle and the weight and thickness of the blade. Once the appropriate operating width has been determined, the blade is manufactured and shaped to that width. That is, each wing member of a conventional blade is of unitary construction and of fixed length.

As mentioned above, soil resistance varies significantly with location. In light sandy soils, soil resistance is lower and a blade plough designed for use in harder ground will therefore not operate at maximum efficiency as it could otherwise operate with a greater width for the same tractive power. Conversely, a plough having an operating width designed for use in sandy soils may not be able to operate in hard soils with that width.

It is an object of the present invention to overcome or substantially ameliorate one or more of the abovedescribed problems of prior art blade ploughs.

It is a more specific object to provide an improved blade plough having a pitch control point compensator.

It is another specific object to provide a blade plough having a improved cutting edge which maintains a penetrative profile with use.

It is another specific object to provide an improved blade plough having a variable operating width.

In one broad form, this invention provides a blade plough of the type comprising a wheeled frame; a generally horizontal blade connected to said wheeled frame, said blade being adapted to operate below the surface of the soil; a sub-frame pivotally connected to said wheeled frame intermediate its wheel axis and said blade, said sub-frame having a drawbar member for connection to a tractive vehicle in use; whereby said frame is pivotable independently of the drawbar connection to the tractive vehicle; characterised in that said blade plough comprises means for biasing said frame to a predetermined operative attitude.

In the preferred embodiment, the plough has a single pair of coaxial wheels located on respective opposite sides of the frame. The blade is fastened to at least one tyne or leg which depend(s) downwardly from the frame and is located rearwardly of the wheels. The sub-frame is pivotally connected to the underside of the main frame along a transverse axis located between said wheels and the blade. The drawbar of the sub-frame extends forwardly of the blade plough to provide an attachment point to the tractor or other tractive vehicle.

The frame suitable includes a flange extending forwardly of the frame to provide a "gooseneck" fitting above the drawbar.

The biasing means may be of any suitable type and construction. For example, a spring may be mounted to the gooseneck fitting to bias the frame, and hence the blade, in the correct operating attitude. The biasing means provides a dominant or stabilizing force on the pitch control point I at the end of the gooseneck fitting to compensate for varying soil-dependent forces.

In another form, the present invention provides an improved cutting edge for an earth working implement such as a blade plough, characterised in that said cutting edge is provided with a layer of harder material on its underside adjacent the leading edge thereof.

The harder layer suitably comprises a more wear resistant material than the cutting edge.

The harder layer can be a separate layer fixed to the underside of the cutting edge by any known suitable method, for example by welding, bolting or clamping. Alternatively, the underside of the cutting edge can be hard surfaced to provide the harder layer, for example by fusing a hard surfacing alloy on the underside.

Since the hard layer is provided on the underside of the cutting edge, the top side of the cutting edge will continue to wear away with use at a faster rate than the hard laminate underneath. This ensures that the penetrative "wood chisel" profile is maintained with use in the harder and more abrasive soils. Consequently, less horsepower is required to pull or push the earth working implement due to the improved slicing effect of the cutting edge. The provision of the hard laminate on the underside of the cutting edge also extends the working life of the cutting edge considerably.

In yet another form, the present invention provides a blade plough comprising a generally horizontal blade supported intermediate its ends, and blade extension members detachably connected to the free ends of said blade for extending the operating width of said plough.

Typically, the blade extension members comprise blade attachments which are bolted onto the free ends of the blade on either side of the plough. The blade attachments are preferably shaped to continue the plan profile of the blade member.

The blade extension members may have individual cutting edges affixed thereto. Alternatively, a new cutting edge of unitary construction may be provided across the Whole extended width of each wing of the blade.

In order that the invention may be more fully understood and put into practice, a preferred embodiment thereof will now be described by way of example with reference to the accompanying drawings, in which.

Figure 1:
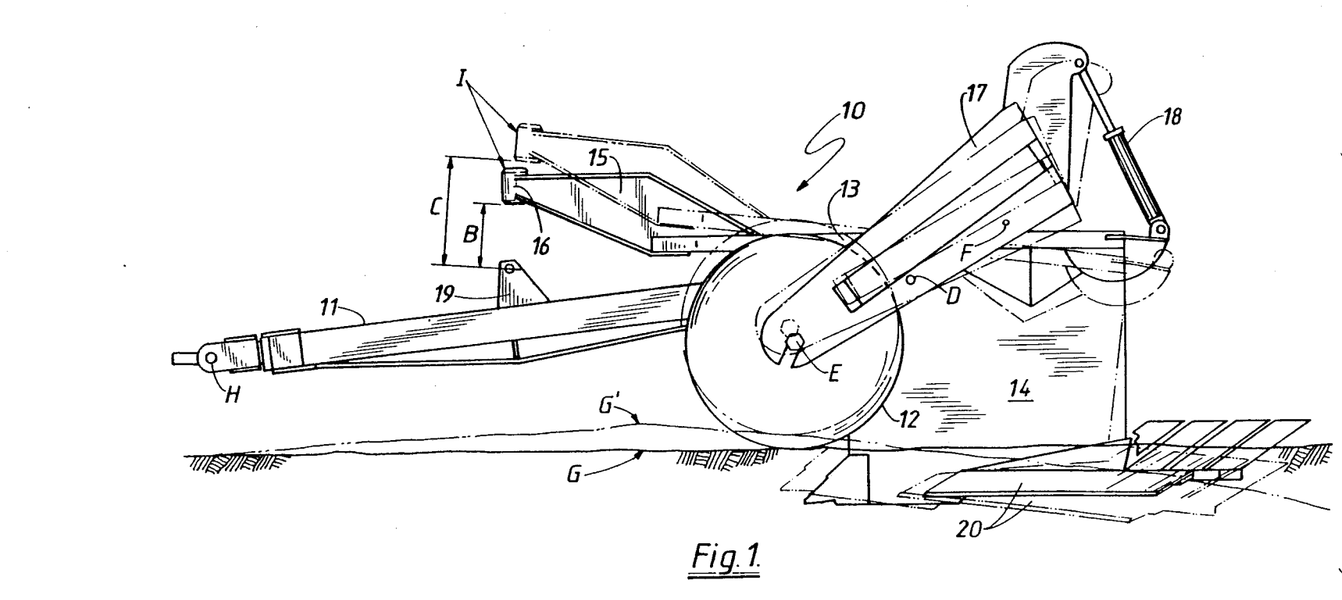
FIG. 1 is a side elevational view of a blade plough.

As shown in FIG. 1, a blade plough 10 comprises a frame 13 mounted on a pair of wheels 12 which rotate about a common axis E. Typically, the frame 13 comprises a thick steel plate. The frame 13 has a central tyne or leg 14 depending downwardly therefrom at the rear end of the plough. Attached to the bottom end of the tyne or leg 14 is a V-shaped horizontal blade 20. Aerating fins 35 may be provided on the blade to assist in killing the cut roots of the vegetation to be eradicated, e.g. brigalow plants. The frame 13 also includes an extension 15 extending forwardly thereof to provide a gooseneck fitting 16.

The wheels 12 are mounted on wheel arms 17 which are pivotally connected to frame 13 at one or more pivot points along a transverse axis F. The angle of wheel arms 17 and hence the position of wheels 12 can be adjusted by hydraulic cylinder(s) 18.

A sub-frame comprising a drawbar 11 is pivotally connection to the underside of frame 13 at one or more points along a transverse axis D which is located behind the wheel axis E and forward of the blade 20. An attachment point H is provided at the forward end of the drawbar 11 for attachment to a tractor, crawler or similar tractive vehicle.

During normal operation along level ground G, the horizontal blade 20 will cut or slice through the soil at a predetermined distance below the surface of the soil. When the blade plough encounters an undulation G', the frame 13 will pivot relative to the drawbar sub-frame 11 to allow the blade to continue ploughing substantially at the predetermined pitch even though the attachment point H of the drawbar 11 has traversed the undulation G'. That is, since the frame 13 may pivot independently of the attachment point H, the blade will continue ploughing at substantially the same pitch and depth on the uphill plane while the tractor is on the downhill plane. Correct ploughing depth is vital for effective eradication of woody re-growth.

Figure 11:
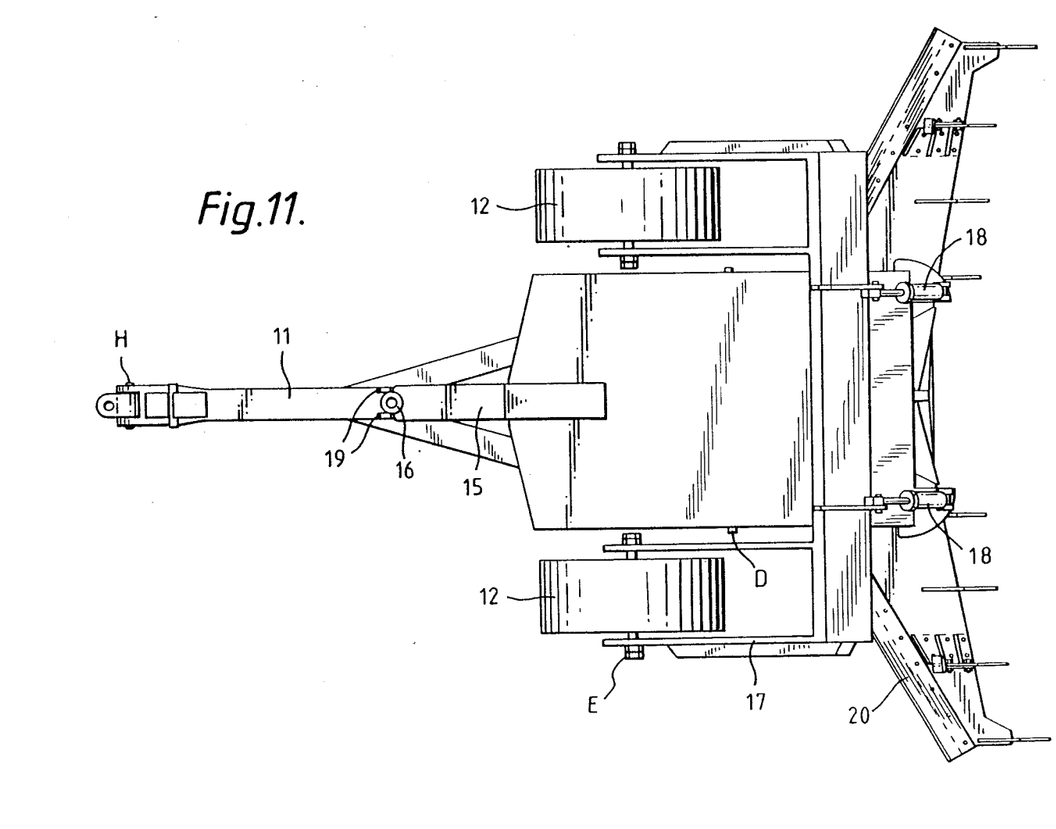
FIG. 11 is a top plan view of the blade plough of FIG. 1.

The free floating frame 13 is able to function effectively provided that there is a balance between the forces acting on the frame 13. Normally, the combination of the forward pulling action at the connection point D the ploughing force on the blade 20 will achieve a stabilising anti-clockwise moment on the frame 13 or, in other words, will provide a slightly dominating downward force on the pitch control point I at the forward end of the extension 15. The position of the wheel axis E is important in countering this downward force. If the upward force applied at the wheels is insufficient, the float will not occur. If the upward force is too high, the float goes to the top of its range and remains there. Proper functioning of the free floating frame therefore requires a delicate balance of forces. However, soil resistance may vary quite considerably, even within the same paddock. As the position of the wheels is generally fixed during ploughing, the upward force at the pitch control point I resulting from the soil forces may not be adequately balanced. The above-described features of the subject blade plough are further illustrated in the overhead plan view of FIG. 11.

In order to overcome this problem, the present invention provides bias means at the pitch control point I to compensate for varying soil forces on the blade 20. In the preferred embodiment, illustrated in FIG. 2, a shaft 21 is provided through a sleeve in the gooseneck fitting 16 at the end of the extension 15, i.e. at the pitch control point I. The fitting 16 is free to slide up and down shaft 21. The shaft 21 is pivotally connected to a flange 19 on the draw bar sub-frame. Springs 22A and 22B are provided above and below the gooseneck fitting 16, respectively, to bias the pitch control point I in its correct position. The springs 22A and 22B may be tensioned by varying the position of respective threaded end plates 23A, 23B, e.g. to suit the general characteristics of the soil to be ploughed. This biasing system provides such downward force as is required to balance the varying upward force acting on the pitch control point I. In other words, the free floating pitch system is retained, but with the frame biased towards a desired operative attitude.

Figure 2:
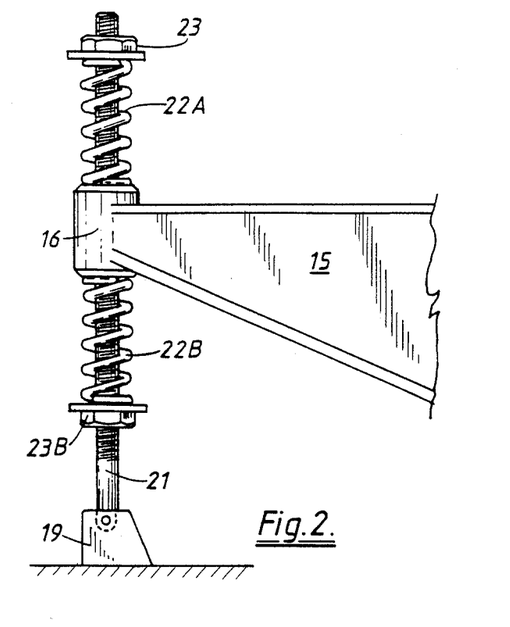
FIG. 2 is a side elevational view of biasing means for use with the blade plough of FIG 1.
Figure 3:
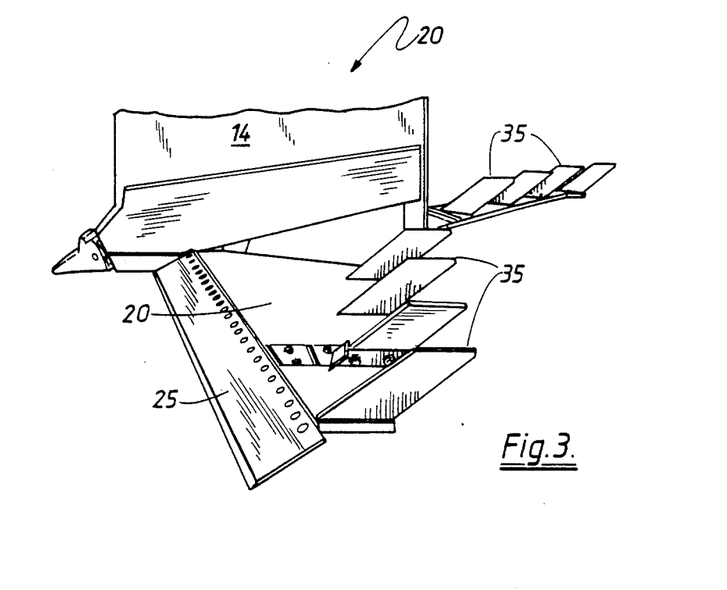
FIG. 3 is a perspective view of the blade of FIG. 1.

Other bias means can suitably be used. For example, a single spring may be mounted between flanges connected to the end plate 23 and gooseneck fitting 16. Alternatively, the springs 22A, 22B may be replaced by other resilient biasing means.

The blade plough of the preferred embodiment also comprises a cutting edge 25 fastened to the mould board 26 of the blade plough, typically by bolts 27 as shown in FIG. 4, or other suitable fasteners. The cutting edge 25 is orientated at an angle to the soil to facilitate penetration. In this respect, the cutting edge is analogous to the profile of a wood chisel.

After a period of use, conventional cutting edges will be worn away by the harder and more abrasive soils to a profile as illustrated in FIG. 5. The wear pattern 24 caused by soil flowing over the conventional cutting edge in the direction "P" results in a land area "A" being formed on the underside of the cutting edge. This land area resists penetration of the soil by the cutting edge.

In the preferred embodiment, a harder or more wear-resistant layer 28 is provided along the underside of the cutting edge 25 as shown in FIG. 6. The hard layer 28 extends rearwardly from the leading edge of the cutting edge. The harder layer 28 may be of any known suitable material, for example wear-resistant alloy steels such as tungsten steels or the like. The wear-resistant laminate 28 may be fixed to the underside of the cutting edge 25 by any suitable method, for example welding or bolting. Alternatively, the hard laminate 28 can be formed by hard surfacing the underside of the cutting edge with a wear-resistant alloy.

Figure 7:
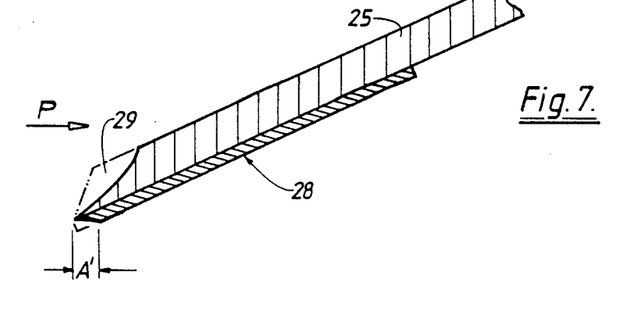
FIG. 7 is a cross sectional view of the worn profile of the improved cutting edge of FIG. 6.
Figure 8:
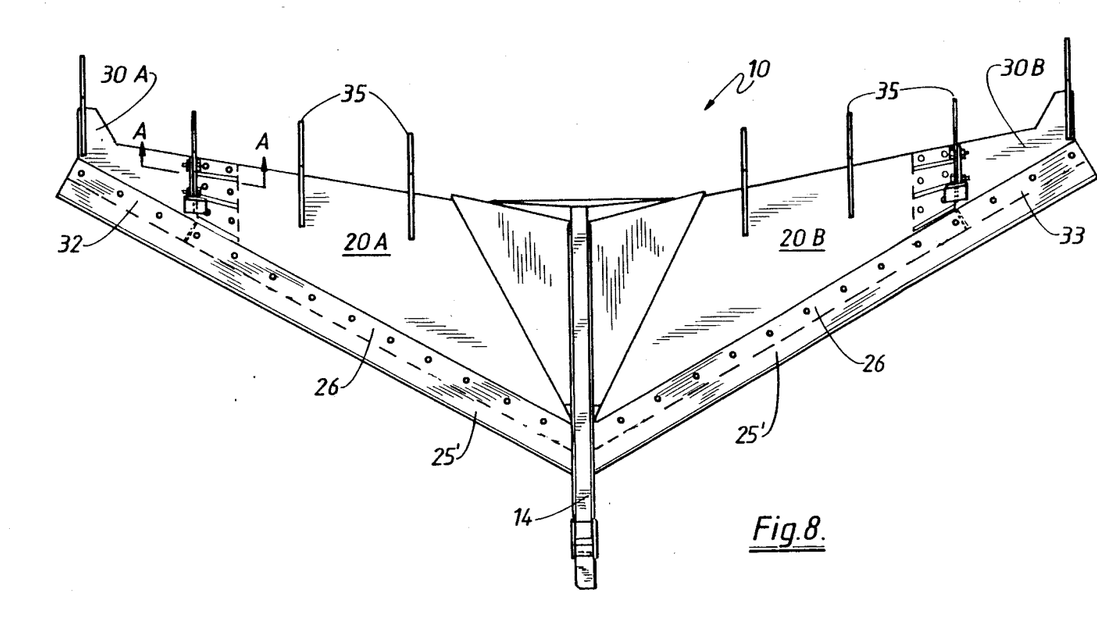
FIG. 8 is a plan view of the blade of the preferred embodiment.

Although the improved cutting edge of the invention will wear with use, the worn profile 29 as shown in FIG. 7 is still a "chisel" profile and the penetrative properties are retained to a large degree. The chisel profile is retained since the cutting edge is of softer material than the hard laminate. Hence, the hard laminate 28 will always remain as the leading edge of the cutting edge. Although a land area A' will be formed on the hard layer 28, the land area A' of the improved cutting edge of this invention is typically one-third or less than the land area A of the conventional cutting edge of FIG. 5. The end result is that the improved cutting edge is able to maintain penetration with use, thereby maintaining fuel efficiency and not increasing the power required of the tractor implement. Although the improved cutting edge has been described with particular reference to a blade plough, it can also be used with other earth-working implements.

The blade plough of the preferred embodiment also comprises blade extension members in the form of blade attachments 30A, 30B which are bolted to the free ends of the blade wings 20A, 20B respectively. The connection between blade attachment 30A and blade wing 20A is shown in more detail in FIGS. 9 and 10, the connection between blade attachment 30B and blade wing 20B being of similar construction. (The fins 35 have been omitted from FIGS. 9 and 10 for clarity).

Figures 9, 10:
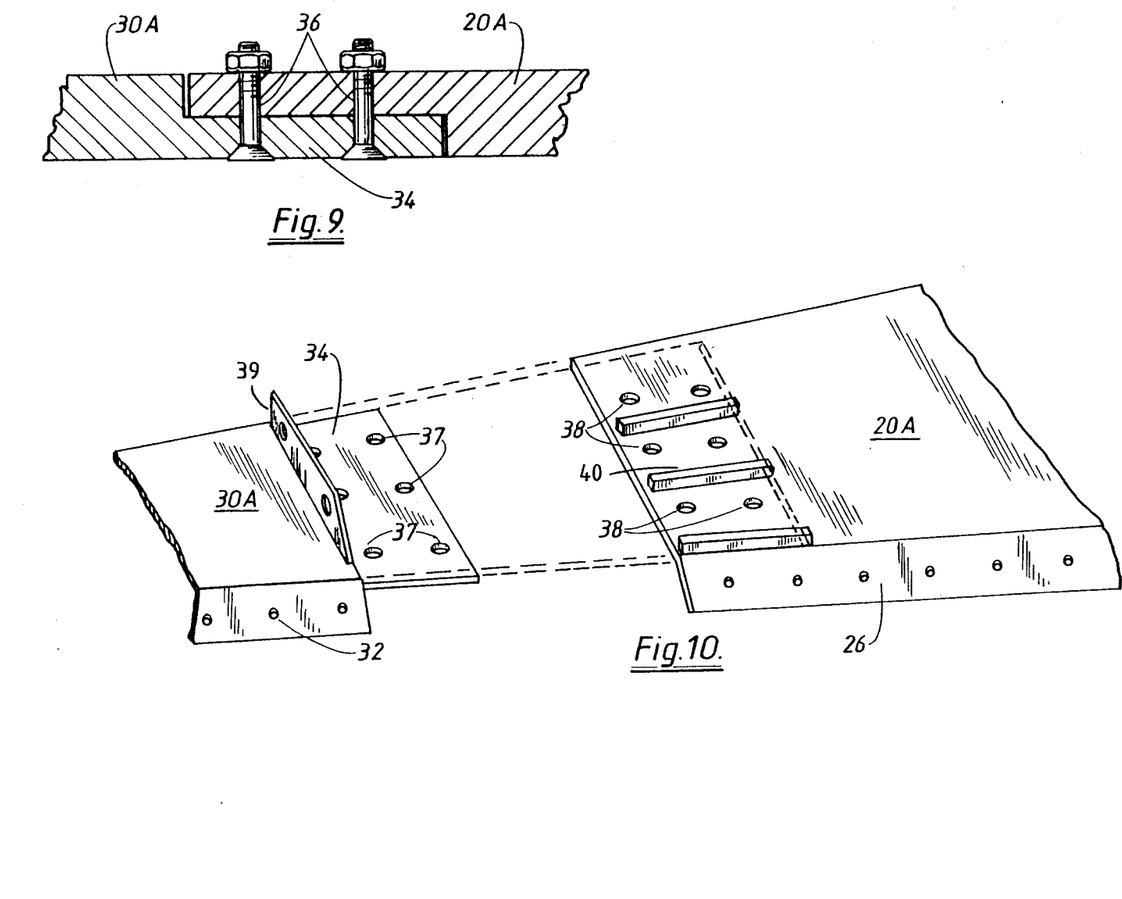
FIG. 9 is a cross-sectional view along A—A of FIG. 8.
FIG. 10 is an exploded perspective view of the attachment area of the blade plough of FIG. 8.

The blade wing 20A has an undercut portion at its outer (free) end which overlaps with a tongue 34 connected to blade attachment member 30A. A plurality of bolt holes 38, 37 are provided in the blade wing 20A and tongue 34 so that bolts 36 may be inserted in the registered holes to fasten the blade attachment 30A to the end of the blade wing 20A. Flange 39 on the attachment 30A can be bolted to the fin 35 at the end of blade wing 20A.

Preferably the top and bottom surfaces of blade wing 20A and attachment 30A are flush when the tongue 34 is received under the undercut portion of the blade wing 20A as shown in FIG. 9. (Bars 40 may be welded to the wing 20A to protect the nuts on bolts 36 from abrasion). Similarly, the mouldboards 26, 32 are aligned when the attachment 30A is connected with blade wing 20A.

Other methods of detachably fastening the extension member 30A to the blade wing 20A, may be used. For example, the extension member 30A may be provided with a number of pins extending laterally therefrom for engagement in corresponding sockets located in the abutting end of blade wing 20A.

If the extension member 30A is connected to the end of blade wing 20A to increase the operating width of the blade plough, the original cutting edge is removed, and an extended cutting edge 25' is fastened to both mouldboards 32, 26. In an alternative embodiment, the extension member 30A is provided with its own cutting edge fastened to mouldboard 32 so that the extension member 30A provides not only a continuation of the blade wing 20A, but also a continuation of the cutting edge.

The foregoing describes only some embodiments of the invention, and modifications which are obvious to those skilled in the art may be made thereto without departing from the scope of the invention as claimed in the following claims.

I claim:

1. A blade plough of the type comprising: a wheeled frame; a generally horizontal blade connected to said wheeled frame, said blade being adapted to operate below the surface of the soil; a sub-frame pivotally connected to said wheeled frame at a location between its wheel axis and said blade, said sub-frame having a drawbar member for connection to a tractive vehicle in use, said frame being pivotable about said pivot connection to said sub-frame independently of the drawbar; said frame further comprising an extension at the forward end thereof having a sleeve portion slidable along an upright shaft member whose lower end is pivotally connected to said sub-frame; characterized in that said blade plough comprises means for biasing said frame to a predetermined operative attitude, said biasing means comprising at least one coil spring mounted between said extension and an end plate mounted on said shaft.

2. A blade plough as claimed in claim 1, wherein said biasing means comprises a pair of springs mounted on opposite sides of said sleeve member for biasing said sleeve member at a predetermined position along said shaft.

3. A blade plough as claimed in claim 1, wherein each wheel thereof is mounted on a respective wheel arm located at the side of said frame, each wheel arm being pivotally connected to said frame along a common axis.

4. A blade plough as claimed in claim 1, wherein said blade includes a cutting edge member connected to the leading edge thereof, said cutting edge member having a layer of wear resistant material on the underside thereof which is harder than the cutting edge member.

5. A blade plough of the type comprising: a wheeled frame including at least one tyne extending downwardly therefrom wherein a generally horizontal blade is connected intermediate its ends to the bottom of said tyne; said blade being adapted to operate below the surface of the soil; a sub-frame pivotally connected to said wheeled frame at a location between its wheel axis and said blade, said sub-frame having a drawbar member for connection to a tractive vehicle in use, said frame being pivotable about said pivot connection to said sub-frame independently of the drawbar; and blade extension members detachably connected to respective ends of said blade for extending the operating width of said blade plough, characterized in that said blade plough comprises means for resiliently biasing said frame to a predetermined operative attitude.

6. A blade plough as claimed in claim 5, wherein said blade comprises a plurality of upstanding fin members on the topside thereof.

7. A blade plough of the type comprising: a wheeled frame; a generally horizontal blade connected to said wheeled frame, said blade being adapted to operate below the surface of the soil; a sub-frame pivotally connected to said wheeled frame at a location between its wheel axis and said blade, said sub-frame having a drawbar member for connection to a tractive vehicle in use, said frame being pivotable about said pivot connection to said subframe independently of the drawbar; said frame further comprising an extension at the forward end thereof having a sleeve portion slidable along an upright shaft member whose lower end is pivotally connected to said sub-frame; characterized in that said shaft member comprises means for biasing said frame to a predetermined operative attitude, said biasing means comprising at least one coil spring mounted between said extension and an end plate mounted on said shaft.

8. A blade plough as claimed in claim 7, wherein said biasing means comprises a pair of springs mounted on opposite sides of said sleeve member for biasing said sleeve member at a predetermined position along said shaft.

* * * * *